US00RE40445E

(19) United States
(12) Reissued Patent
Yamawaki et al.

(10) Patent Number: US RE40,445 E
(45) Date of Reissued Patent: Aug. 5, 2008

(54) GOLF CLUB HEAD CROWN

(75) Inventors: Koichi Yamawaki, Encinitas, CA (US); Sherry Jones, Pataskala, OH (US)

(73) Assignee: Taylor Made Golf Company, Inc., Carlsbad, CA (US)

(21) Appl. No.: 29/193,473

(22) Filed: Sep. 11, 2003

Related U.S. Patent Documents

Reissue of:
(64) Patent No.: Des. 457,212
Issued: May 14, 2002
Appl. No.: 29/139,545
Filed: Mar. 30, 2001

(51) LOC (8) Cl. ..... 21-02
(52) U.S. Cl. ..... D21/752; D21/759
(58) Field of Classification Search ..... D21/733, D21/752, 759; 473/327–331, 343–346
See application file for complete search history.

(56) References Cited

U.S. PATENT DOCUMENTS

| | | | | | |
|---|---|---|---|---|---|
| 1,669,482 | A | * | 5/1928 | Miller | 473/328 |
| 3,815,921 | A | * | 6/1974 | Turner | 473/328 |
| 4,332,388 | A | | 6/1982 | Crow | |
| 5,213,329 | A | | 5/1993 | Okumoto et al. | |
| D343,665 | S | | 1/1994 | Feche et al. | |
| 5,316,305 | A | * | 5/1994 | McCabe | 473/332 |
| D351,441 | S | * | 10/1994 | Iinuma et al. | D21/752 |
| D361,356 | S | | 8/1995 | Feche et al. | |
| 5,524,890 | A | * | 6/1996 | Kim et al. | 473/242 |
| D371,816 | S | * | 7/1996 | Yoshioka | D21/752 |
| D396,512 | S | | 7/1998 | Besnard et al. | |
| D398,681 | S | | 9/1998 | Galy | |
| 5,938,541 | A | | 8/1999 | Allen et al. | 473/305 |
| D426,604 | S | | 6/2000 | Besnard et al. | |
| 6,149,534 | A | | 11/2000 | Peters et al. | 473/345 |
| D437,375 | S | * | 2/2001 | Hocknell et al. | D21/759 |
| D438,583 | S | * | 3/2001 | O'Doherty et al. | D21/733 |
| D448,439 | S | * | 9/2001 | Hocknell et al. | D21/759 |
| D457,212 | S | | 5/2002 | Yamane et al. | |
| D479,294 | S | * | 9/2003 | Evans et al. | D21/759 |
| D496,084 | S | * | 9/2004 | Imamoto | D21/759 |
| D500,824 | S | * | 1/2005 | Imamoto | D21/759 |

* cited by examiner

*Primary Examiner*—Mitchell Siegel
(74) *Attorney, Agent, or Firm*—Sheppard, Mullin, Richter & Hampton LLP

(57) CLAIM

We claim the ornamental design for a *portion of a* golf club head *crown*, as shown and described.

DESCRIPTION

FIG. 1 is a top front perspective view of a *portion of a* golf club head *crown* embodying our new design.
FIG. 2 is a top plan view thereof.
FIG. 3 is a front elevational view thereof.
FIG. 4 is a left side elevational view thereof.
FIG. 5 is a rear elevational view thereof.
FIG. 6 is a right side elevational view thereof.
FIG. 7 is a bottom plan view thereof; and,
FIG. 8 is a bottom front perspective view thereof.
The broken lines of FIGS. 1–8 are included for illustrative purposes only, and form no part of the claimed design.

1 Claim, 3 Drawing Sheets

Matter enclosed in heavy brackets [ ] appears in the original patent, but forms no part of this reissue; matter printed in italics indicates the additions made by reissue.

Amended

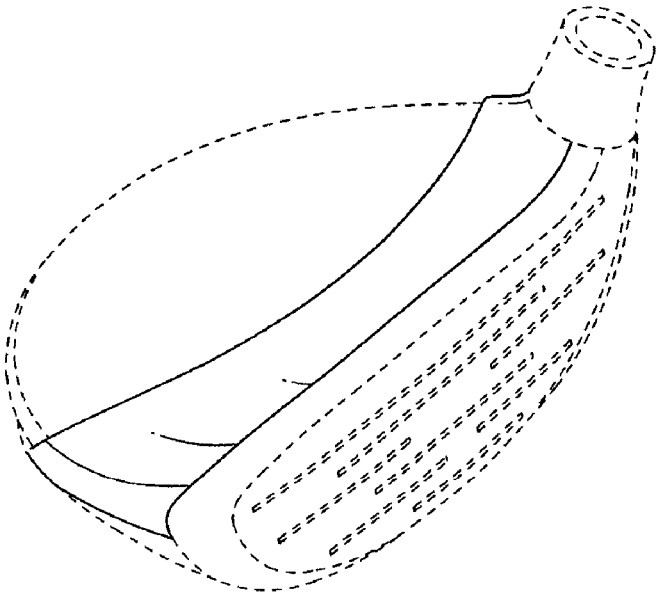
FIG. 1 Amended
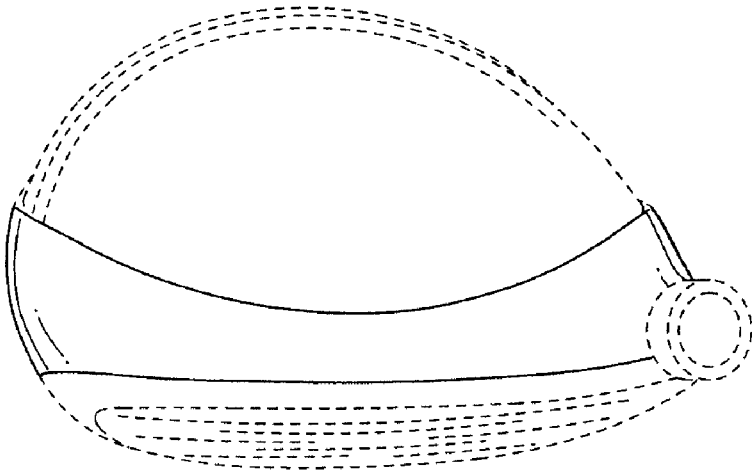
FIG. 2 Amended

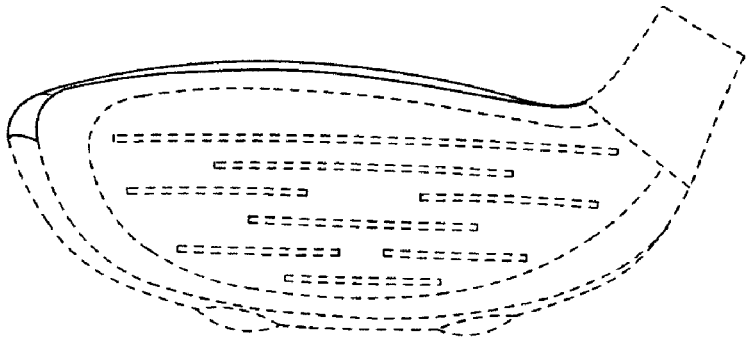
FIG. 3 Amended
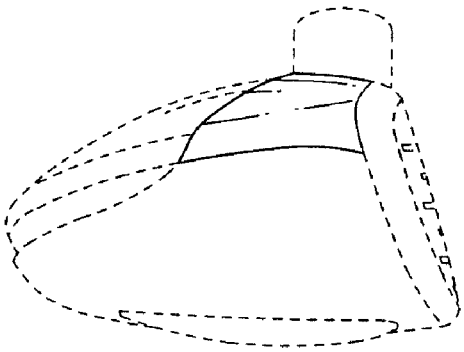
FIG. 4 Amended
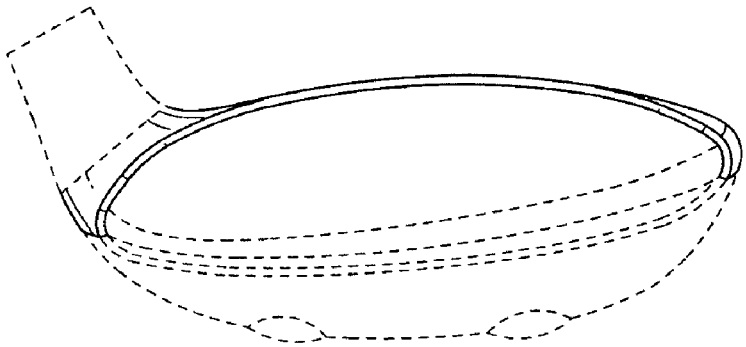
FIG. 5 Amended

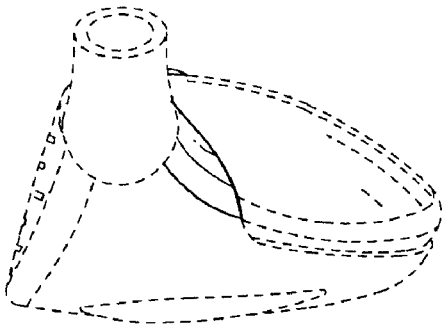
FIG. 6 Amended
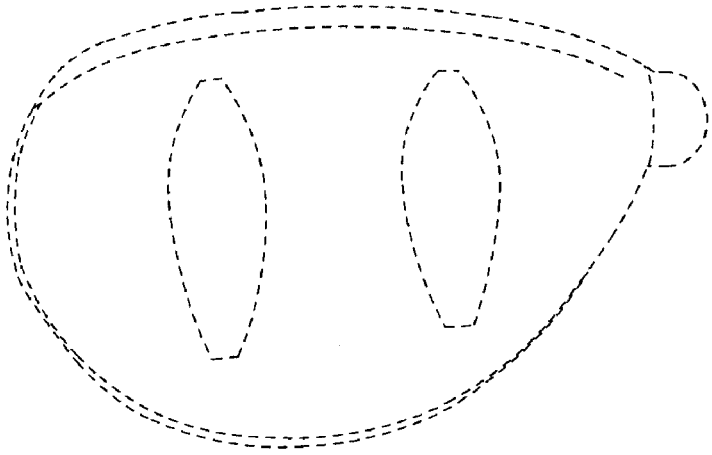
FIG. 7 Amended
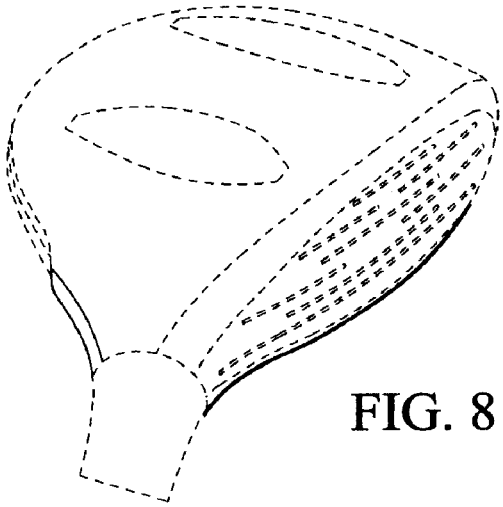
FIG. 8 Amended